(12) United States Patent
Keith

(10) Patent No.: US 7,315,840 B1
(45) Date of Patent: Jan. 1, 2008

(54) PROCEDURAL ORDER SYSTEM AND METHOD

(75) Inventor: Christopher Keith, New York, NY (US)

(73) Assignee: PDQ Enterprises LLC, New York, NY (US)

( * ) Notice: Subject to any disclaimer, the term of this patent is extended or adjusted under 35 U.S.C. 154(b) by 428 days.

(21) Appl. No.: 10/329,174

(22) Filed: Dec. 24, 2002

Related U.S. Application Data

(60) Provisional application No. 60/352,453, filed on Jan. 28, 2002, provisional application No. 60/319,045, filed on Dec. 26, 2001.

(51) Int. Cl.
*G06Q 40/00* (2006.01)
(52) U.S. Cl. .......................................... 705/37; 705/35
(58) Field of Classification Search .................. 705/37, 705/35
See application file for complete search history.

(56) References Cited

U.S. PATENT DOCUMENTS 6,098,051 A * 8/2000 Lupien et al. ............ 705/36 R
6,278,982 B1 8/2001 Korhammer
7,162,448 B2 1/2007 Madoff

OTHER PUBLICATIONS

Wall Street & Technology, "The Second Coming of Merrin". Aug. 10, 2000, p. 1-7, print from on-line on Aug. 16, 2005.*
Wall Street & Technology, "The Second Coming of Merrin". Aug. 10, 2000, p. 1-7, print from on-line on Aug. 16, 2005.*
Aliason, Alan L., "Online Business Computer Applications". ISBN 0-574-18620-4, 1987 Second Edition, (11 pages attached).*
web.archive.org/web/20010101-20011101re_/http://nyfix.com, "NYFIX Millennium", published in early 2001.
web.archive.org/web/20001208122200/www.atdesk.com/strategy.html, "ATD Strategy for the Future", published in 2000.

* cited by examiner

*Primary Examiner*—James A. Kramer
*Assistant Examiner*—Kirsten Apple
(74) *Attorney, Agent, or Firm*—Brenda Pomerance

(57) ABSTRACT

A procedure is a template that specifies trigger conditions and what to do when the trigger conditions occur, or do not occur within a specified time. Generally, a procedure corresponds to an order handling strategy used by a trader. A menu of standard procedures exist, and custom procedures are accommodated after being qualified for use in the present system. An interest represents an intent to trade. In contrast, an order is a definite commitment to buy or sell a certain amount. Generally, an institution or professional trader will know that they wish to trade when conditions are right, but will not be quite ready to submit an order. The institution or trader thus represents untapped market liquidity. By representing such liquidity as interests, the liquidity can be more efficient coupled to markets. Typically, a trader creates an interest by selecting a procedure from a menu, then supplying parameters representing what the trader wishes to trade and the conditions that will convert the general interest to a specific order. The interest is sent to a procedure processor. The procedure processor stores interests in an interest book, stores procedures in a procedure book, and when the triggers for the procedures specified in the interests occur, the procedure processor executes the procedures to spawn orders or notifications to block trading systems of willingness to negotiate. Thus, the liquidity represented by the interests is injected into markets.

50 Claims, 8 Drawing Sheets

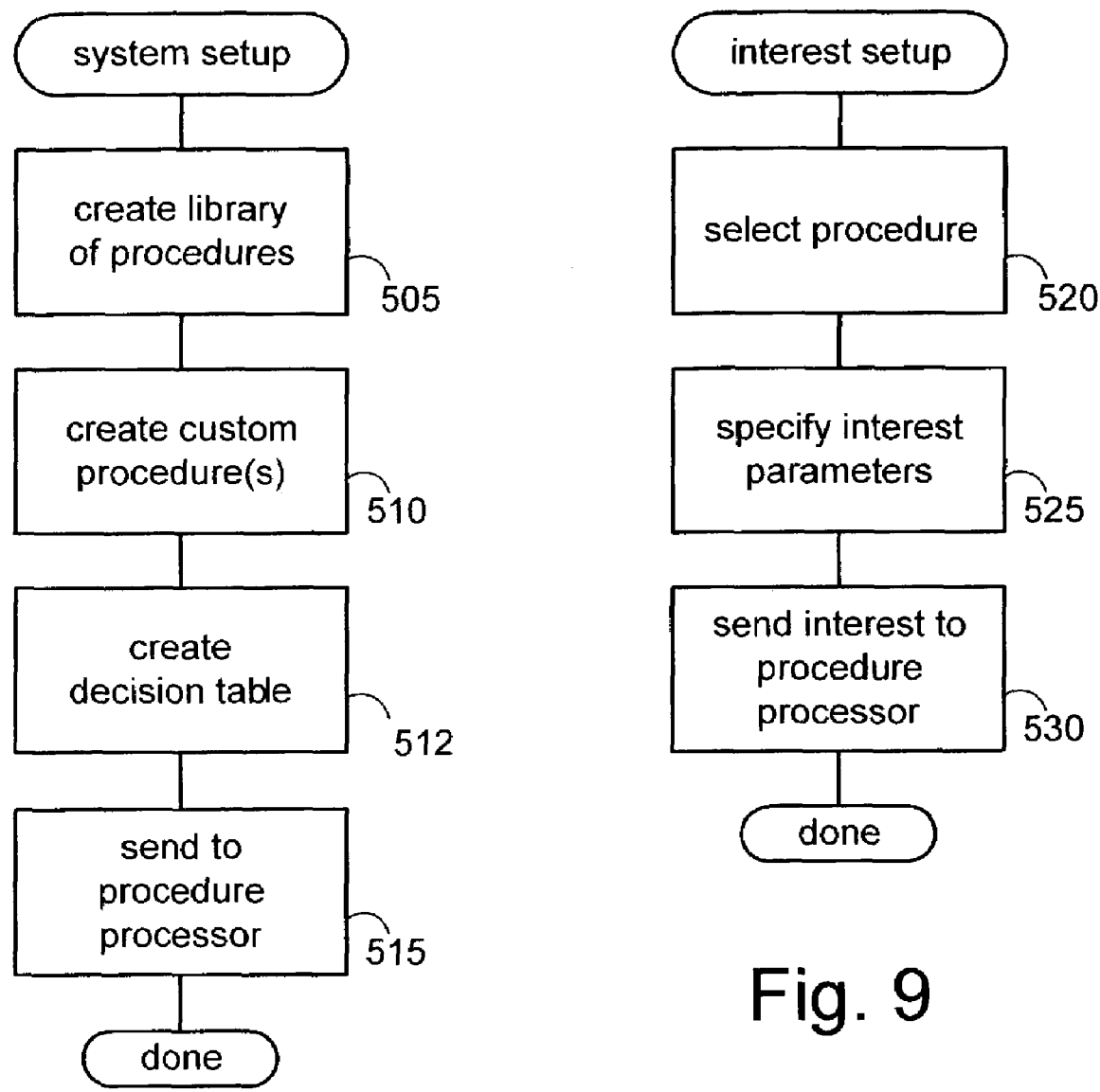

PROCEDURAL ORDER SYSTEM AND METHOD

BACKGROUND OF THE INVENTION

The present invention relates to trading systems for improving market liquidity, and more particularly, is directed to automating generation of an order in response to order flow information.

Securities trading is a highly competitive industry. Conventionally, sophisticated traders have computers running programs for monitoring market data information and, in response thereto, automatically generating orders and sending the orders to a marketplace for execution. The computer programs enable faster response to market conditions. However, the market data information that stimulates these computer programs consists of execution prices for trades that just occurred. Thus, conventional order generation programs are always reacting to historical information.

Recently, equities began trading on major markets in decimals, hundredths of a dollar, instead of eighths of a dollar. As expected, bid-ask quote spreads have narrowed. Contrary to expectations, the increasing market transparency has resulted in a decline in the quality of markets, measured by stability and volume. It appears that the narrow spread leaves inadequate room for market makers to profitably do business.

Another concern is that electronic communication networks (ECNs) typically pay a small fee, such as $0.001 per share, to parties who provide liquidity by entering orders for storage in the ECN, and charge a larger fee, such as $0.02 per share, to parties who execute against the stored orders. In some markets, it would be preferable to reverse the cost burden.

NYFIX Millennium (www.nyfix.com) is a computer system that enables users to contribute a pool of liquidity by passing their NYSE DOT (Designated Order Turnaround) and institutional block volume through Millennium on its way to the floor of the NYSE. This pass-through volume is allowed to interact with resting orders that can improve the price reflected on the NYSE by at least $0.01. If Millennium cannot improve price, the order is immediately sent on to its original destination for execution. Millennium limits users to bidding on incoming orders. Millennium's methodology is simply to look at incoming order flow. Millennium keeps the order's originator anonymous.

Instant Forwarding is a feature of NYFIX Millennium. If an order is sent to NYFIX Millennium and is not immediately executed in the System, thereby obtaining a better price that is available on an established market, the order is instantly routed to a secondary destination predetermined by the trader. In most ECNs, if an order is not immediately executed, the order is "stranded" there, waiting for either an execution or cancellation. The problem with that scenario is that while an order is waiting in an ECN, a better price may be available in the primary market which a trader would not be able to take advantage of without first canceling his/her order.

Anonymous matching is another feature of NYFIX Millennium. Traders can expose large blocks of stock to the constant liquidity pool flowing back and forth over the NYFIX Network and be able to receive executions, with no one ever seeing their orders. An Institution will never have to reveal that it is trying to accumulate or sell a position. Throughout the post-trade and clearing stages of the execution process, buyers and sellers remain completely anonymous.

Intelligent Order Routing (IOR) is a service of NYFIX Millennium. For smaller orders, if NYFIX Millennium is unable to obtain a better price, the IOR functionality sends that order, in real-time, to the execution venue statistically most likely to improve the price. NYFIX Millennium analyzes the statistics of price improvement and expects to increase them by leveraging all the different execution points and determining, for each individual order, where the best price is usually achieved. This function provides a client with two chances at achieving a better price that the displayed national best bid or offer, first NYFIX Millennium, and second, through IOR.

NYFIX Millennium operates with two basic order types: pass-through orders and conditional orders. Pass-through orders are those that pass-through NYFIX Millennium on their way to another liquidity source, such as a primary or regional exchange, third market firm or ECN. If a match can be found within Millennium, an execution is sent back to the trader in real-time. If no match is found, the order merely "passes through" NYFIX Millennium and continues on to the predetermined destination. Conditional orders provide a mechanism for larger, institutional-size orders to be anonymously and invisibly exposed to the marketplace. Entering conditional orders into NYFIX Millennium enables traders to specify various trading conditions that will trigger an execution when particular conditions are met. Conditional orders can be crossed with pass-through or other conditional orders. NYFIX Millennium has proposed offering users the ability to place orders at the opening, closing and volume weighted average price (VWAP).

Harborside Plus (www.harborsideplus.com) is a block trading system that accepts an indication of interest (IOI) from a trader, and stores the IOI. An IOI represents a willingness to trade a particular size, with the minimum being 25,000 shares. Only the side and symbol are required, limits are optional. The actual order size is never sent. When the system identifies a match between counterparties, the buyer and seller are both notified by telephone and a negotiation begins. The Harborside Plus trading desk facilitates the negotiation, such as by providing the national best bide and offer midpoint price at the time of the match as a reference point. The buyer and seller identities remain completely confidential. When the buyer and seller reach agreement, the trade is reported by Harborside Securities.

Liquid Net (www.liquidnet.com) is an alternative trading system (ATS) for buy-side institutions in the United States. Liquidnet brings natural buyers and sellers together and enables them to anonymously negotiate trades among each other, without intermediaries or information leaks. The Liquidnet system brings liquidity to the trader, reversing the current paradigm of searching for liquidity. Liquidnet offer complete anonymity—buyers' and sellers' identities are never revealed, even after a trade is completed. Liquidnet orders are matched based on quantity parameters continuously monitored throughout the day, i.e., quantity discovery rather than price discovery. Liquidnet assumes anonymous, one-on-one negotiations that enable traders to maintain complete control of execution price and quantity.

The term "best execution" is most accurately described as delivering the execution that best suits the client's needs, that may vary from simply obtaining the best price on a single trade, to maintaining anonymity, to speed of execution, to reduction of price dis-improvement. Due to the varying and sometimes contradictory constraints imposed by traders and markets, there is room to improve the ability of order generation programs to interact with the market.

SUMMARY OF THE INVENTION

In accordance with an aspect of this invention, there are provided a method of and a system for storing an interest having an action and a trigger condition selected from at least two types of events, detecting when the trigger condition is satisfied, and executing the action when the trigger condition is satisfied.

In aspects of the invention, the trigger condition is selected from an order indication, a market data event or a time event, a negotiation interest from an external system, and a go-along request. The action is to spawn an order. Parameters of the spawned order are based on parameters of an order indication that triggered spawning of the spawned order.

In aspects of the invention, the interest defines acceptable trading contra-parties. A procedure is associated with the interest, the procedure defining parameters specified by the interest.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 8 and 9 are flowcharts referred to in explaining a setup phase; and

DETAILED DESCRIPTION

A procedure is a template that specifies trigger conditions and what to do when the trigger conditions occur, or do not occur within a specified time. Generally, a procedure corresponds to an order handling strategy used by a trader. A menu of standard procedures exist, and custom procedures are accommodated after being qualified for use in the present system.

An interest represents an intent to trade. In contrast, an order is a definite commitment to buy or sell a certain amount. Generally, an institution or professional trader will know that they wish to trade when conditions are right, but will not be quite ready to submit an order. The institution or trader thus represents untapped market liquidity. By representing such liquidity as interests, the liquidity can be more efficiently coupled to markets.

Typically, a trader creates an interest by selecting a procedure from a menu, then supplying parameters representing what the trader wishes to trade and the conditions that will convert the general interest to a specific order. The interest is sent to a procedure processor.

The procedure processor stores interests in an interest book, stores procedures in a procedure book, and when the triggers for the procedures specified in the interests occur, the procedure processor executes the procedures to spawn orders or notifications to block trading systems of willingness to negotiate. Thus, the liquidity represented by the interests is injected into markets.

The procedure processor provides very limited communication to the trader: only execution reports and selected status reports. Accordingly, it is safe for parties to submit interests as they remain strictly confidential.

The orders spawned by the procedure processor in response to order indications are treated somewhat similar to "immediate or cancel" orders, that is, an execution report is not received within a short time, such as 100 msec, the procedure processor cancels the order. However, orders spawned in response to market data or the like may specify other behavior.

Figure 1:
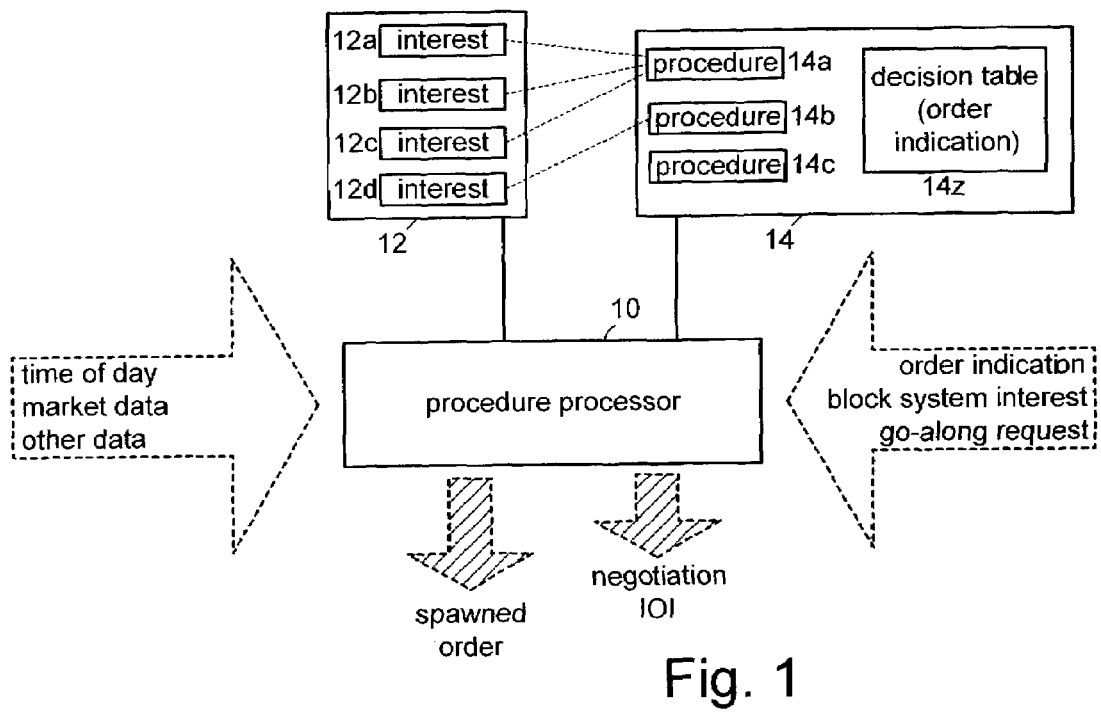
FIG. 1 is a diagram referred to in explaining the present invention.

FIG. 1 shows interest book 12 and procedure book 14 coupled to procedure processor 10. Interest book 12 contains interests 12a, 12b, 12c, 12d. Procedure book 14 contains procedures 14a, 14b, 14c and decision table 14z. Interests 12a, 12b, 12c are associated with procedure 14a. Interest 12d is associated with procedure 14b. Procedure 14c has been defined but is not being used by any interest. Decision table 14z specifies how order indications should be shown to stored interests.

Figure 2:
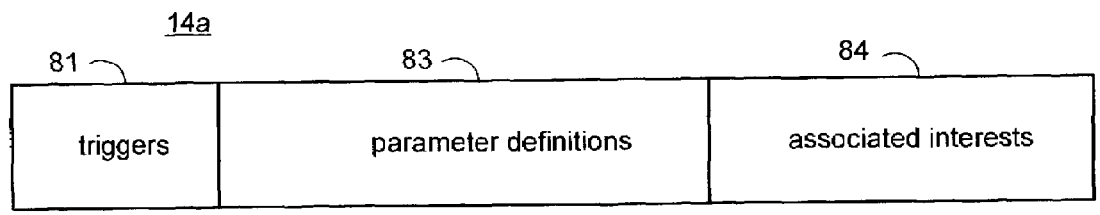
FIG. 2 is a diagram showing a procedure.

FIG. 2 shows procedure 14a having triggers section 81, parameter definitions section 83 and associated interests section 84. Triggers section 81 specifies one or more conditions that must exist for the actions section to be executed by procedure processor 10. Parameter definitions section 83 is used to define the parameters used by the procedure, such as size of spawned order, total shares in the interest, when the interest expires, and acceptable contra-parties. Contra-parties can be specified positively (ex: only broker a, broker b), negatively (ex: all except broker a, broker b) and by name or by behavior (ex: only brokers who have traded with me in the last 2 months). Associated interests section 84 identifies the interests using this procedure; initially, this section is always empty. An example of procedure 14a is shown in Table 1.

TABLE 1

| | |
|---|---|
| procedure name | procedure 14a |
| triggers | order to buy at least nn shares |
| parameters | sym = symbol of security |
| | nn = shares of incoming order |
| | m1 = maximum amount of shares per spawned sell order |
| | m2 = total amount of shares for the interest |
| | delta = maximum difference from last sale |
| | extime = expiration time |
| | contras = contra parties accepted or denied |
| associated interests | interest 12a, interest 12b, interest 12c |

Figure 3:
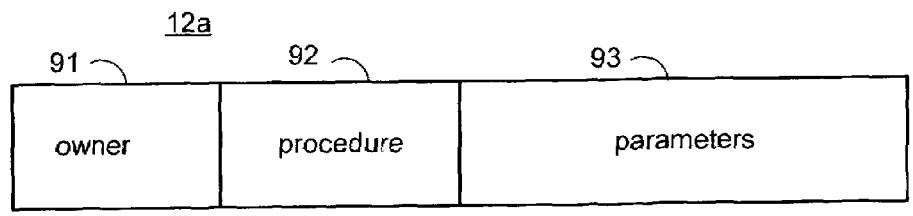
FIG. 3 is a diagram showing an interest.

FIG. 3 shows interest 12a having owner section 91, procedure section 92 and parameters section 93. Owner section 91 specifies the party who created and retains control over the interest. Procedure section 92 specifies the procedure that the interest should be associated with. Parameters section 93 specifies the parameters for the selected procedure. An example of interest 12a is shown in Table 2.

TABLE 2

| | |
|---|---|
| interest name | interest 12b |
| owner | trader 70 |
| procedure | procedure 14a |
| parameters | sym = IBM |
| | nn = 10,000 |
| | m1 = 30,000 |
| | m2 = 200,000 |
| | delta = $0.04 |
| | extime = 2003 Jan 5, 11:30 a.m. |
| | contras = all except Broker Bluefield |

The interest defined in Table 2 says that when an buy order exists for at least 10,000 shares of IBM, then generate a sell order of up to 30,000 shares and send it to the same marketplace that the buy order is being sent to, and do this until 200,000 shares have been sold, accepting a price difference of up to four cents from the last trade, and trading with anyone except Broker Bluefield. The interest expires on Jan. 5, 2003 at 11:30 am.

It will be appreciated that many other types of procedures can be defined, and thus a huge variety of interests can be accommodated via the present interest/procedure technique.

As used herein, a "go-along request" is a communication from a specialist or market maker requesting more liquidity to complete part of a trade whose price has already been agreed upon.

Returning to FIG. 1, procedure processor 10 is responsive to several types of stimuli, corresponding to system interrupts:

1. time of day—processor 10 keeps a time-order queue of trigger conditions for stored interests, times can be specified either absolutely or relative to market open or close times;
2. market data—processor 10 receives market data from various marketplaces and can use this market data to satisfy trigger conditions for stored interests;
3. other data—processor 10 receives other data such as weather forecasts, crop predictions and so on, and can use this data to satisfy trigger conditions for stored interests;
4. order indication—processor 10 receives indications of orders that are en route to various marketplaces, and can use the order indications to satisfy trigger conditions for stored interests. Also, when processor 10 spawns an order, if the trigger was other than an order indication, then processor 10 generates an order indication for the spawned order so that waiting interests can respond to the spawned order. Additionally, a new interest willing to interact with stored interests generates an order indication;
5. block system interest—processor 10 receives indications of willingness to trade from various block systems and can use this information to satisfy trigger conditions for stored interests;
6. go-along request—processor 10 receives go-along requests and can use these requests to satisfy trigger conditions for stored interests.

Procedure processor 10 is adapted to spawn new orders when suitable trigger conditions of its stored interests are met. Procedure processor 10 also serves to generate negotiation (indications of interest) IOIs when suitable trigger conditions of its stored interests are met.

Procedure processor 10 serves to create an electronic crowd, creating competition for order fills and thus improving the quality of markets. Procedure processor 10 benefits dealers by gathering potential liquidity is a readily accessible form, and benefits brokers by providing an environment to match trading interests.

Generally, parties who submit interests are charged fees, whereas incoming order flow is charged little or no fees. This fee structure is the opposite of a conventional ECN charging policy.

A challenge for the present system is to convince traders that the system prevents improper behavior by other traders. One example of improper behavior is front-running, that is, submitting a same-side order ahead of a massive order to take advantage of the price change that will be caused when the massive order is exposed to the market. Generally, the present system enables traders to obtain information about their own interests, but not anyone else's. In some embodiments, interests cannot trigger based on same-side order indications.

Figure 4:
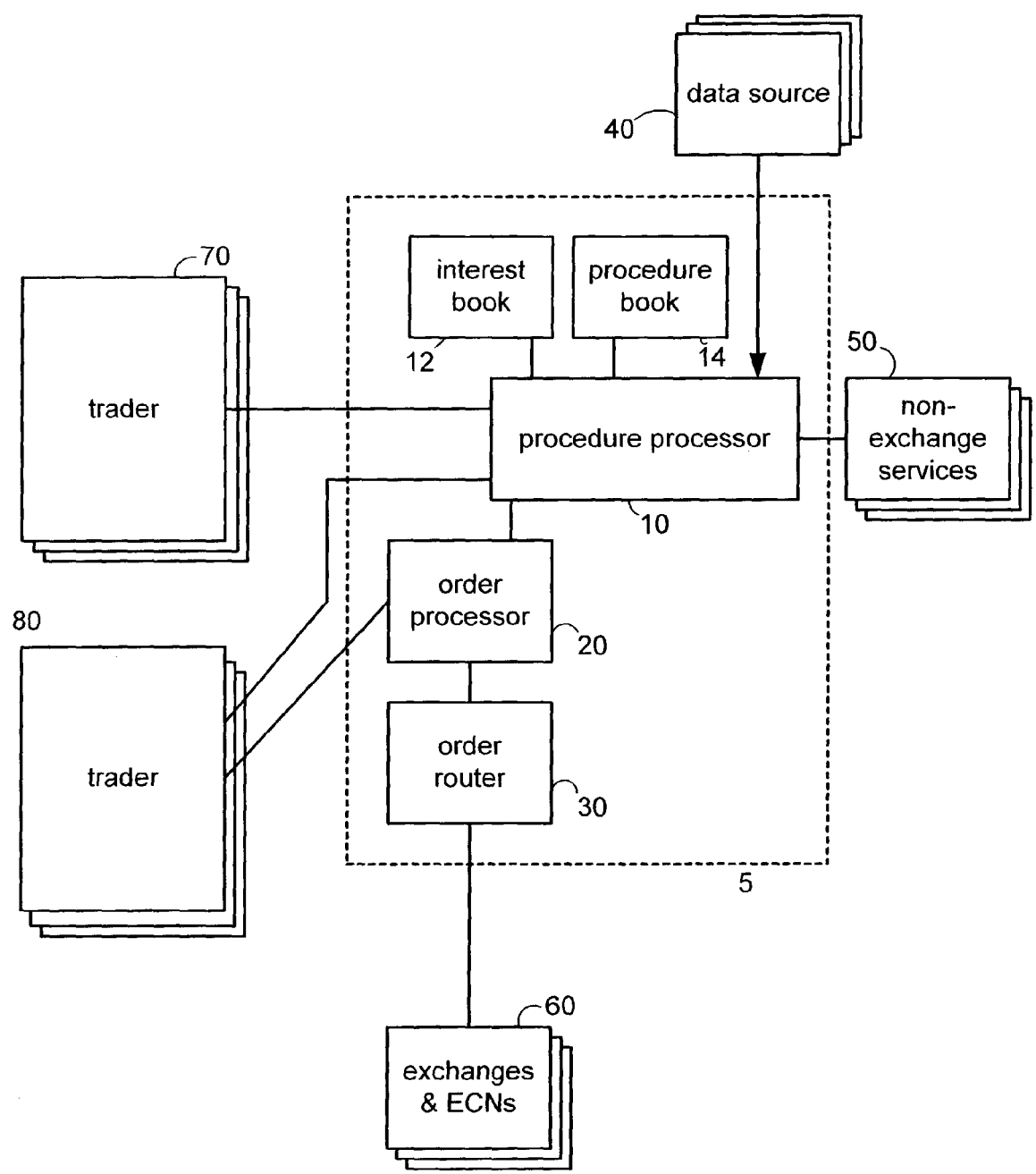
FIGS. 4-7 are block diagrams showing respective environments in which the present invention is applied.
Figure 5:
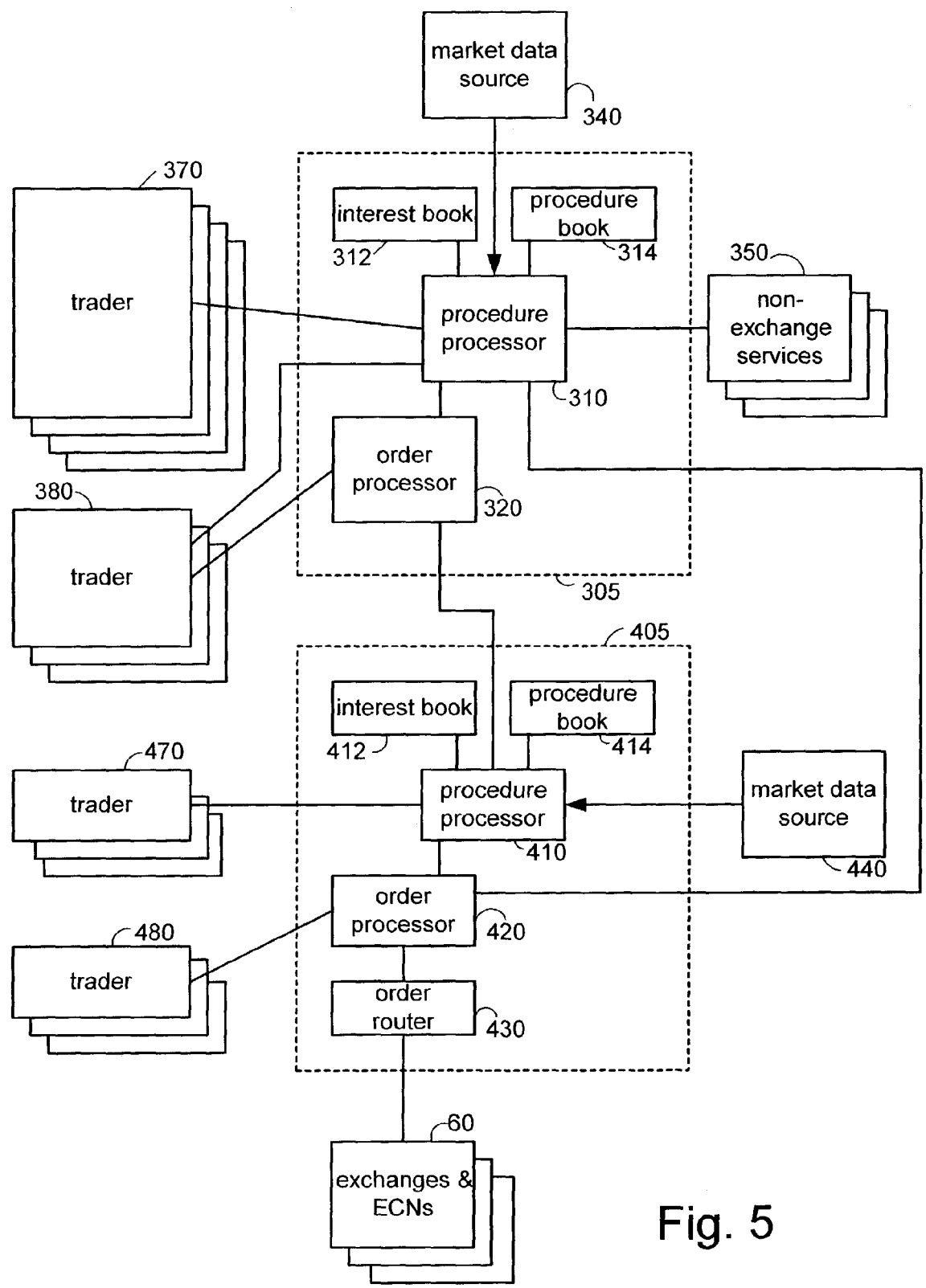
Figure 6:
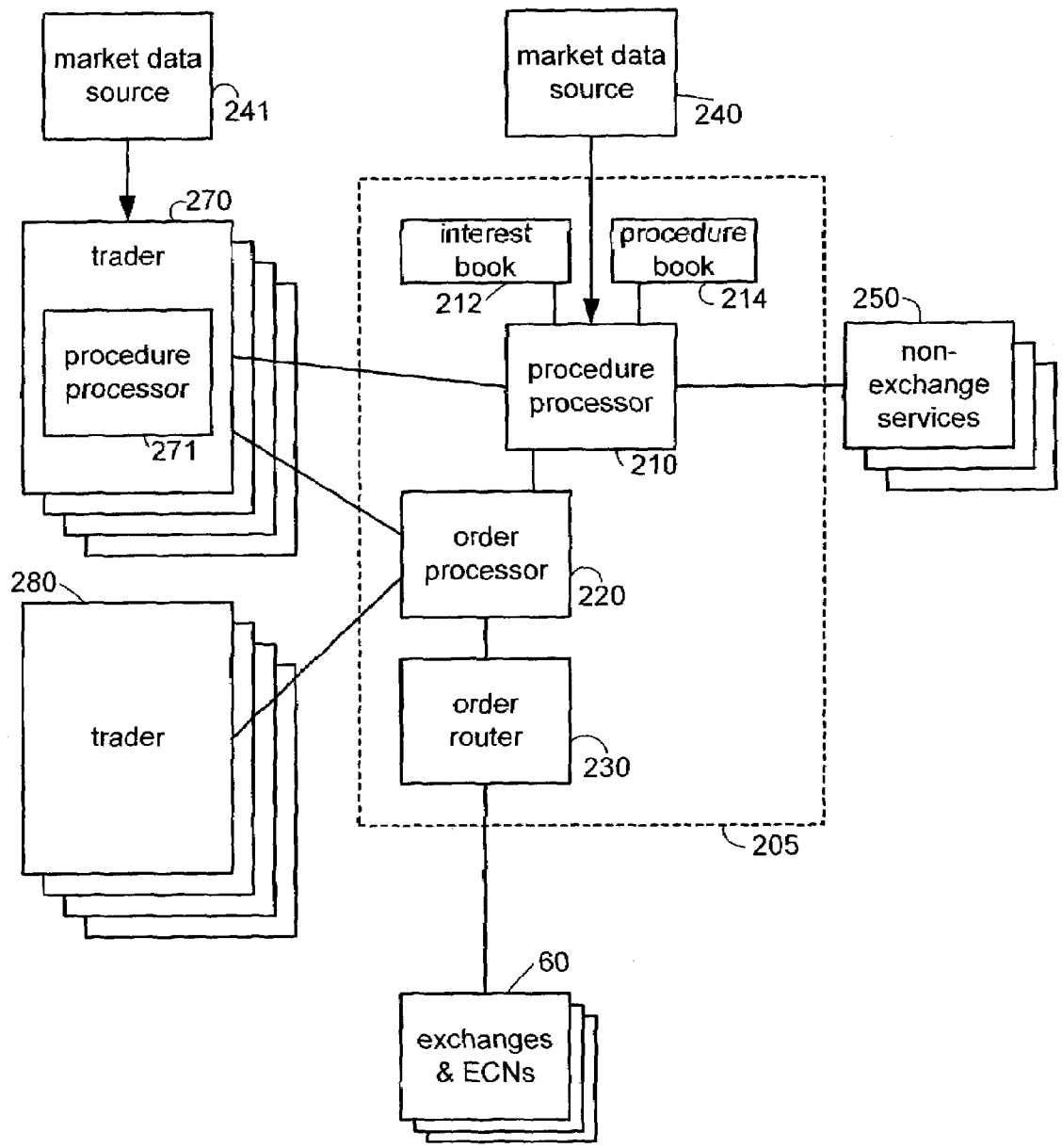
Figure 7:
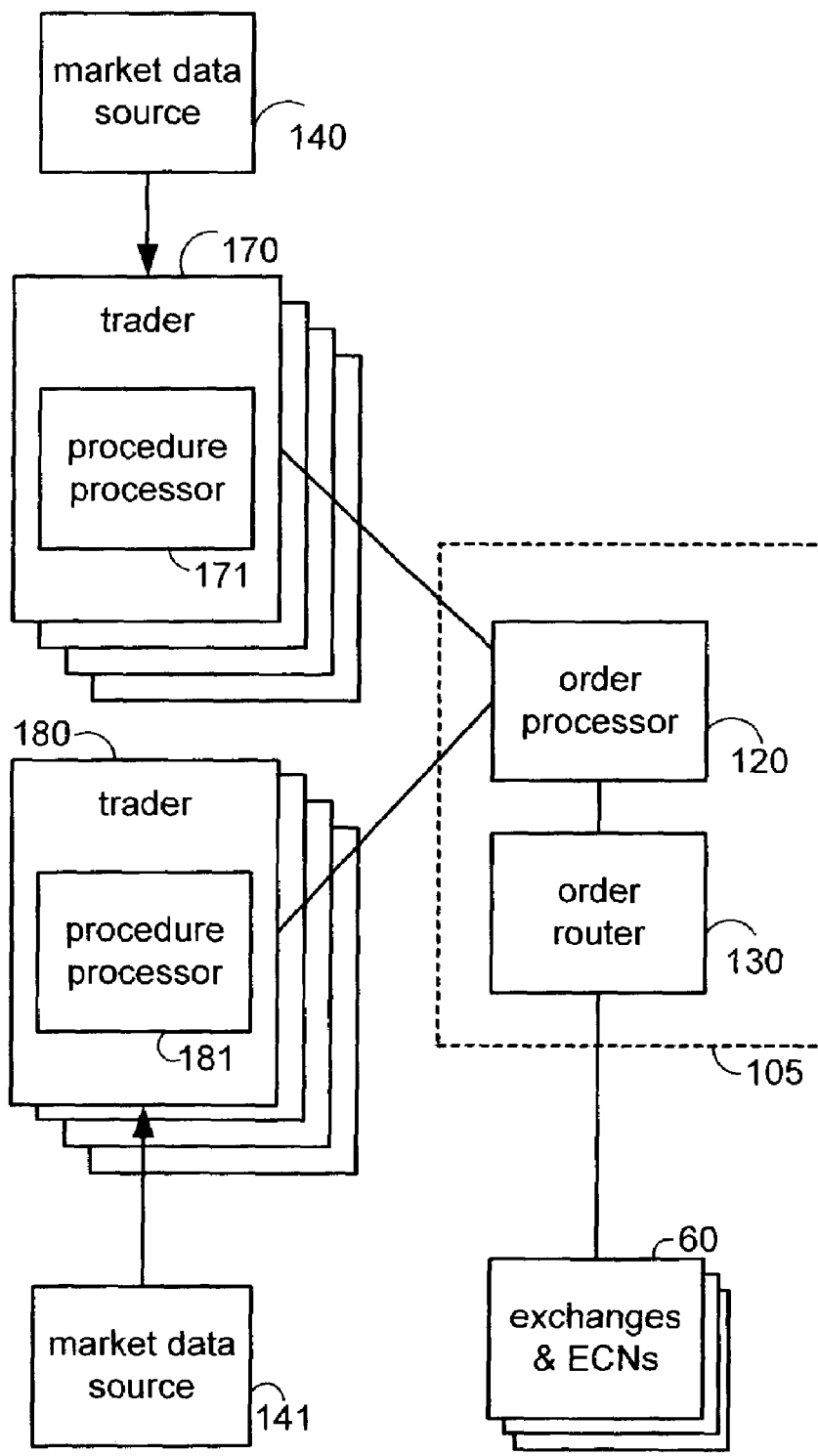

FIGS. 4-7 are block diagrams showing respective environments in which the order generation program resides. In FIG. 4, the procedure processor resides at a central location. In the embodiment of FIG. 5, the procedure processor resides at multiple central locations. In the embodiment of FIG. 6, the procedure processor resides at both the central and trader's locations. In the embodiment of FIG. 7, the procedure processor resides at an individual trader's location. In other embodiments, the procedure processor resides at the trader's location and multiple central locations.

FIG. 4 shows central location 5 comprising procedure processor 10 coupled to interest book 12 and procedure book 14, and order processor 20 that is coupled to order router 30. Each of procedure processor 10 and order processor 20 is coupled to various trader locations, shown as traders 70 and 80. Procedure processor 10 is also connected to market data source 40 and to non-exchange services 50, such as order matching services, block trading systems and the like. Order router 30 is connected to external marketplaces 60, such as stock exchanges and electronic communication networks (ECNs) able to execute orders.

Each of procedure processor 10, order processor 20 and order router 30 is shown as a separate general purpose computer appropriately programmed. In other embodiments, procedure processor 10, order processor 20 and order router 30 may execute on the same general purpose computer. In some embodiments, procedure processor 10 is actually a group of processors or virtual processors simultaneously executing similar processing but for different interests and procedures, such as one processor per procedure or one processor per interests for a trading entity.

FIG. 4 shows traders 70 and 80 coupled directly to central location 5. In some embodiments, at least one of traders 70 and 80 is connected via a communications network such as the Internet to central location 5.

Generally, trader 80 sends an order to order processor 20, which sends an order indication about the order to procedure processor 10. Order processor 20 also sends the order to order router 30 for forwarding to an execution location, such as a stock exchange or ECN.

Trader 70 sends an interest to procedure processor 10. Trader 80 is also able to send an interest to procedure processor 10. Each of traders 70 and 80 is able to submit customized procedures, such as procedure 14*b* of FIG. 1, to procedure processor 10, and after validation, procedure 14*b* is included in procedure book 14.

Market data source 40 and non-exchange services 50 each provide non-order information to procedure processor 10. Non-exchange services 50 may be block negotiation services, such as Harborside Plus and/or LiquidNet providing information about parties interested in trading.

It will be appreciated that some traders can enter both orders and interests, while other traders are limited to either orders or interests.

FIG. 5 is somewhat similar to FIG. 4 and, for brevity, generally corresponding elements will not be discussed. In the embodiment of FIG. 5, central locations 305 and 405 have respective procedure processors 310 and 410. Order processors 320 and 420 are respectively coupled to procedure processors 410 and 310. Each central location appears to be a trader, from the perspective of the other central location. The external interfaces at one central location are thus available to the other central location, with no configuration changes required at the external interfaces.

FIG. 6 is somewhat similar to FIG. 4 and, for brevity, generally corresponding elements will not be discussed. In the embodiment of FIG. 6, procedure processor 210 resides at central location 205, and trader 270 has elected to also implement local procedure processor 271. In this embodiment, trader 270 retains its interests that depend on conditions ascertainable from market data source 241, so as to avoid the fees associated with using procedure processor 210 to execute these interests.

FIG. 7 is somewhat similar to FIG. 4 and, for brevity, generally corresponding elements will not be discussed. In the embodiment of FIG. 7, procedure processors 171 and 181 are located at the trader site. Interests are submitted by a trader to his/her respective procedure processor. Only the trader's own order flow is accessible to procedure processors 171, 181, and so the trader's interests are responsive to a much smaller segment of market interest than in the embodiment of FIG. 4. In some embodiments, at least one of traders 170 and 180 is coupled to a non-exchange service, and then the respective procedure processor is able to accommodate interests for negotiation. However, each trader has to configure its own interface, whereas in the embodiment of FIG. 4, new interfaces can be accommodated without configuration changes at the trader location.

FIGS. 8 and 9 are flowcharts referred to in explaining a setup phase.

As shown in FIG. 8, during system setup, at step 505, a library of procedures is created. At step 510, custom procedures are created. Library procedures and custom procedures may also be created during operation of procedure processor 10. At step 512, decision table 14z of FIG. 1 is created. More specifically, each party whose orders will generate order indications for procedure processor 10 specifies how waiting interests should receive the order indication. As an example, one trader may provide an ordered list of contra-parties, specifying that its order indications will be shown to interests from the first contra, then to interests from the second contra and so on. At step 515, the library procedures, custom procedures and decision table are sent to procedure processor 10 for installation therein.

FIG. 9 depicts interest setup, that is, how a trader creates an interest. At step 520, the trader selects a procedure from a menu of library and authorized custom procedures. At step 525, the trader specifies appropriate parameters for the selected procedure. At step 530, the trader sends the interest to procedure processor 10.

Figure 10:
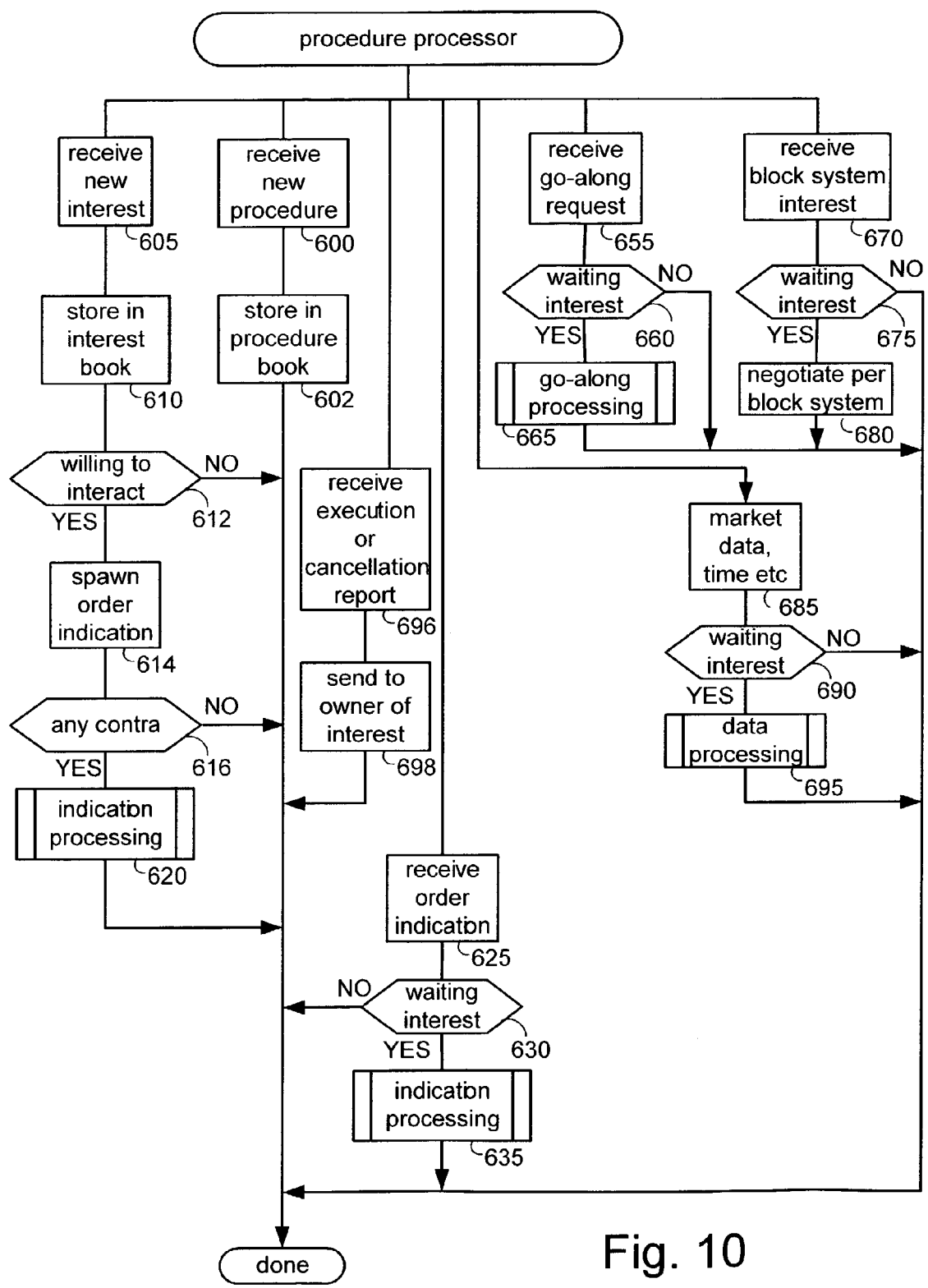
FIGS. 10 and 11 are flowcharts showing operation of a procedure processor according to the present invention.
Figure 11:
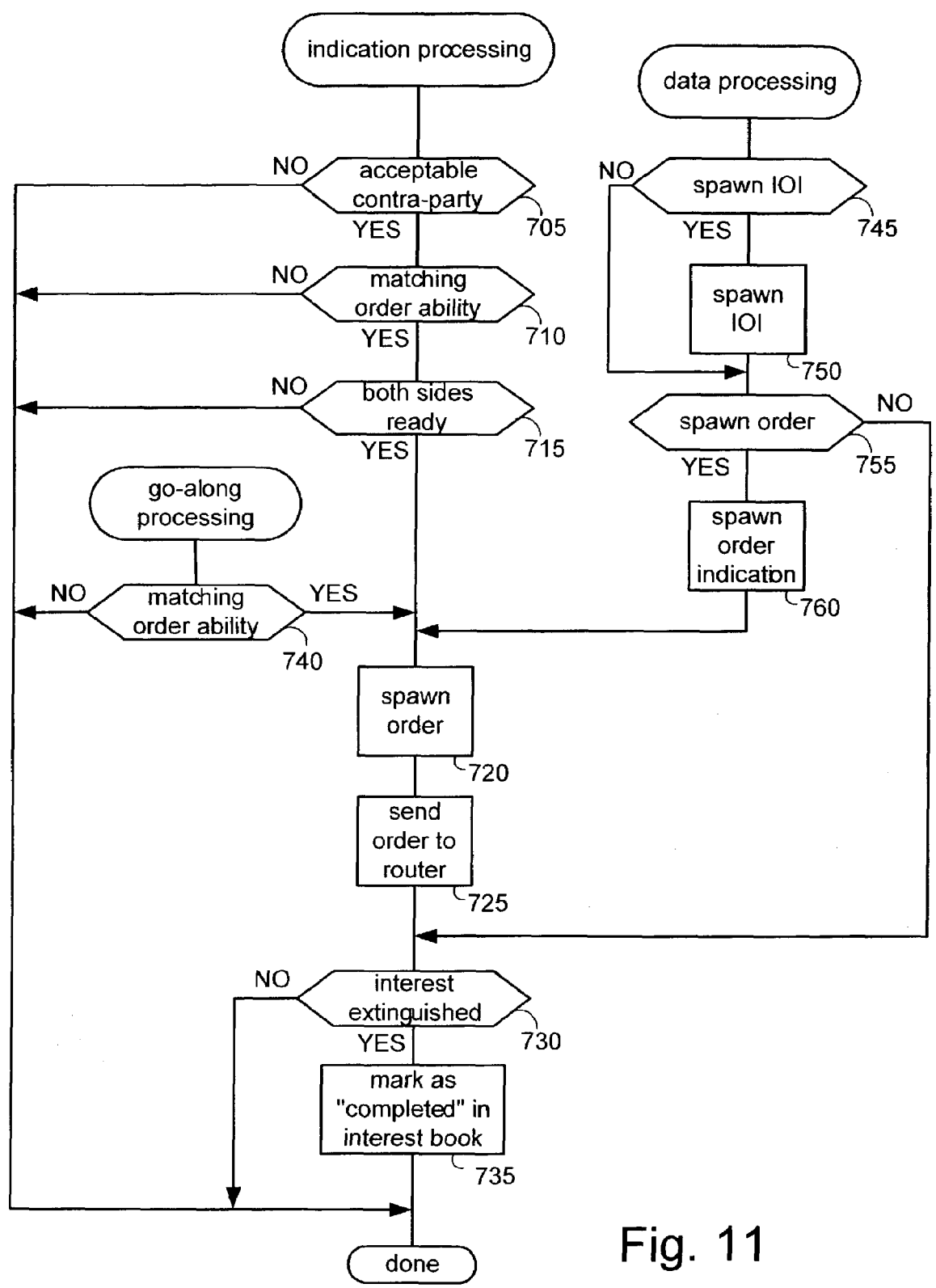

FIGS. 10 and 11 are flowcharts showing operation of procedure processor 10. As shown in FIG. 10, procedure processor 10 typically waits to receive information, then determines which interests want to receive the information and supplies the information thereto. As shown in FIG. 11, after the information has been used to trigger the procedure associated with the interest, procedure processor 10 executes the procedure to determine whether to spawn an order, and possibly an interest indication for unmatched spawned orders, or a negotiation IOI.

Turning to FIG. 10, procedure processor is adapted to receive a new procedure (step 600), a new interest (step 605), an order indication (step 625), a go-along request (step 655), a block system interest (step 670), market data, other data and time information (step 685), and an execution report for a spawned order (step 696).

At step 600, a new procedure is received. At step 605, procedure processor 10 stores the new procedure in procedure book 14.

At step 605, a new interest is received. At step 610, procedure processor 10 stores the new interest in interest book 12. If the interest indicates it is willing to interact with other interests, then at step 614, processor 10 spawns an order indication. At step 616, processor 10 checks if contra-interests are found, and if so, at step 620, executes indication processing (see step 705 of FIG. 11) for the new interest.

At step 625, an order indication is received. At step 630, procedure processor 10 checks whether there are any interests waiting to be triggered by the order indication, and if so, processor 10 uses decision table 14z to find which interests and procedures to trigger. At step 635, processor 10 performs indication processing (see step 705 of FIG. 11) for each of the triggered interest/procedures.

At step 655, a go-along request is received from a specialist or market-maker. At step 660, procedure processor 10 checks whether there are any interests waiting to be triggered by the go-along request, and if so, processor 10 uses decision table 14z to find the order in which to trigger the waiting interests. At step 665, processor 10 performs go-along processing (see step 740 of FIG. 11) for each of the triggered interest/procedures.

At step 670, a block system interest is received from a third party system. At step 675, procedure processor 10 checks whether there are any interests waiting to be triggered by the block system interest, and if so, processor 10 triggers the waiting interests. At step 680, processor 10 performs negotiation in accordance with the external system. For example, Harborside Plus has a trading desk with personnel that speak to the human buyer and seller.

At step 685, non-order information such as market data, time data or other data is received. At step 690, procedure processor 10 checks whether there are any interests waiting to be triggered by the non-order information, and if so, processor 10 triggers the waiting interests. At step 695, processor 10 performs data processing (see step 745 of FIG. 11) for each of the triggered interest/procedures.

At step 696, processor 10 receives an execution report or a cancellation report for a spawned order, and at step 698, processor 10 forwards the execution report or cancellation report to the owner of the interest associated with the spawned order.

FIG. 11 shows the indication processing, data processing, and go-along processing referenced in FIG. 10.

Indication processing will now be described. At step 705, procedure processor 10 checks whether the contra-party is acceptable, and if so, at step 710, checks whether the instant interest has the ability to create a matching order; generally, this is equivalent to checking whether the interest has sufficient quantity. If so, at step 715, processor 10 checks whether both sides are ready. In the case of an order indication, the contra side is always ready. In the case of an interest indication, that is, a newly arrived interest, step 715 is a checkpoint as to whether both sides accept each other. If all tests are positive, then at step 720, procedure processor 10 spawns a new order and at step 725, sends the order to order router 30 via order processor 20. Next, at step 730, processor 10 checks whether the interest has been extinguished, and if so, at step 735, marks the interest as "completed" in interest book 12.

It will be appreciated that the execution report for the spawned order is received at step 696 of FIG. 10.

Go-along processing comprises checking, at step 740, whether the interest has sufficient quantity to create a matching order, and if so, continuing processing at step 720.

Data processing comprises checking, at step 745, whether the market data, time data or other data has triggered the need to negotiate, and if so, at step 750, spawning a negotiation IOI or other suitable message in accordance with the interface of the external negotiation system. Negotiation occurs in the external system, or according to the methodology of the external system. If negotiation is not required or after spawning the negotiation IOI, at step 755, processor 10 checks whether the received data has triggered the need to spawn an order. If so, at step 760, an order indication is sent to procedure processor 10. That is, the spawned order is not matched to an existing order, so other interests may want to provide contra-side liquidity, and are given the opportunity to do so by the spawned order indication. Processing continues at step 720.

A first exemplary use will now be described. Let it be assumed that trader 70 uses procedure 12b, shown in Table 3, to create interest 12d, shown in Table 4.

TABLE 3

| | |
|---|---|
| procedure name | procedure 14b, cleanup |
| triggers | order to sell at least nn shares |
| parameters | sym = symbol of security |
| | nn = shares of incoming order |
| | m1 = maximum amount of shares per spawned buy order |
| | m2 = total amount of shares for the interest |
| | price = CLEANUP |
| | extime = expiration time |
| | contras = contra parties accepted or denied |
| associated interests | interest 12d |

TABLE 4

| | |
|---|---|
| interest name | interest 12d |
| owner | trader 70 |
| procedure | procedure 14B |
| parameters | sym = GRPN |
| | nn = 100 |
| | m1 = 25,000 |
| | m2 = 25,000 |
| | price = CLEANUP |
| | extime = when shares traded |
| | contras = all |

Procedure 14b uses an arbitrarily defined "cleanup" strategy, sometimes referred to as a "ride" strategy. The cleanup strategy looks at the quote (order book) in the best external market, and determines for the contra-side, the best size, the best price, the next-best size and the next-best price. The cleanup strategy spawns an order at a price equal to the contra next-best price offset by the minimum price difference, and having size equal to the lesser of (a) the amount of the interest remaining to be executed less the contra best size, and (b) the amount of the order indication less the contra best size.

Assume that order indication 1112 (not shown) is sent to procedure processor 10. Order indication 1112 is as follows: SELL 6,500 GRPN@13.70. Assume that the best market quote is: BID 1000@13.85, 2000@13.82, 1500@13.77, 5000 (13.74. Without procedure processor 10, the order for order indication 1112 would be executed at the following price per share:

$$(1000*13.85+2000*13.82+1500*13.77+2000*13.74)/6500=13.79$$

However, procedure processor 10 notifies interest 12d of order indication 1112. Interest 12d is triggered by the existence of order indication 1112 to spawn a new order 1113 (not shown) that is matched to the order for order indication 1112. The price for order 1113 is computed as the next-best price (13.82) plus the minimum increment (0.01), namely 13.83. The size of order 1113 is computer as the lesser of (25,000-1,000) and (6,500-1,000), namely, 5,500 shares. Order 1113 is: BUY 5,500 GRPN@13.83.

Procedure processor 10 sends spawned order 1113 to order processor 20 for forwarding to the execution market of the order indicated in order indication 1112. With procedure processor 10, the order for order indication 1112 is executed at the following price per share:

$$(1000*13.85+5500*13.83)/6500=13.83$$

From the viewpoint of the order for order indication 1112, being exposed to procedure processor 10 has resulted in a price improvement of (13.83-13.79)=0.04 per share, at no charge to the order.

A second exemplary use is as follows. Assume interest 12d and a best market quote as above. Trader 80 submits interest 12e shown in Table 5 to procedure processor 10.

TABLE 5

| | |
|---|---|
| interest name | interest 12e |
| owner | trader 80 |
| procedure | procedure 14a |
| parameters | sym = GRPN |
| | nn = 100 |
| | m1 = 10,000 |
| | m2 = 10,000 |
| | delta = market |
| | extime = when shares traded |
| | contras = only trader 70 |

Upon receiving interest 12e, procedure processor 10 exposes it to interest 12d and determines that interest 12d should spawn order 1114 as follows:

BUY 9,000 GRPN@13.83 and that interest 12e should spawn order 1224 as follows:

SELL 10,000 GRPN@MARKET

Procedure processor 10 sends order 1115 and order 1224 to order processor 20 for forwarding to order router 30 and thence to the best external market. With procedure processor 10, order 1224 is executed at the following price per share:

$$(1000*13.85+9000*13.83)/10000=13.83$$

A third exemplary use is as follows. A "fast execute" procedure is defined with a trigger of "check all external markets for a specified price" and an action of "immediately hit the price for up to xx remaining shares". The fast execute procedure can manage orders. Here, procedure processor 10 monitors other markets on behalf of the interests associated with the fast execute procedure.

A fourth exemplary use is as follows. A go-along procedure, procedure 14c, is defined as shown in Table 6 with an associated interest 12f shown in Table 7. Here, if Market Maker Jones requests a buy order for up to 10,000 shares, interest 12f spawns a buy order for 10,000 shares to be part of a trade that has already been priced on an exchange floor.

TABLE 6

| | |
|---|---|
| procedure name | procedure 14c, go-along |
| triggers | go-along request from CONTRA for SIDE for SYM for (nmin, nmax) shares |
| parameters | SYM = symbol of security |
| | nmin = minimum shares of go-along request |
| | nmax = maximum shares of go-along request |
| | m1 = maximum amount of shares per spawned same-side order |
| | m2 = total amount of shares for the interest |
| | price = GO-ALONG |
| | extime = expiration time |
| | contras = contra parties accepted or denied (specialists or market makers only) |
| associated interests | interest 12f |

TABLE 7

| | |
|---|---|
| interest name | interest 12f |
| owner | trader 70 |
| procedure | procedure 14c |
| parameters | side = BUY |
| | sym = GRPN |
| | nmin = 100 |
| | nmax = 10,000 |
| | m1 = 100 |
| | m2 = 80,000 |
| | price = GO-ALONG |
| | extime = 2003 Jan 30, 4 pm |
| | contras = only Jones |

Differences between the present system and NYFIX Millennium are set forth in Table 8.

TABLE 8

| Design Feature | Present System | NYFIX Millennium |
|---|---|---|
| Fundamental Character | is basically an "interests" integration mechanism. Reacting to ordinary order flow is just 1 of 5 tools its customers have. Allows institutional interests to find other institutional interests while remaining both undisplayed, and completely confidential and while seeing potentially 'all' order flow | are one-dimensional price improvement methodologies applied to orders which are passed through them |
| Business Strategy | does not compete with any current service. Generates orders to be executed elsewhere. Makes market reintegration for institutional orders an achievable goal because it adds value to all links, and is non-competitive | compete for order flow and compete with exchanges |
| Technology | is an open platform allowing the user to employ any trading style and any technology. Makes systematized trading style competition practical for all users. Does not require firms to change prove approaches. | restrict the user to a narrow range of system provided options |
| Order Execution | provides pairing of orders which may be executed by either electronic or manual methods. Establishes a fully neutral methodology which can find liquidity whether electronic or on Exchange floors | provide pairing for execution in electronic methodologies only |
| Business Relationships | allows for the maintenance of distinctive inter-firm relationships. Leverages relationships in place and enables development of "electronic" relationships that can be key to profitability | treat the bidding crowd as monolithic |
| Ease of Access | users do not need to make any change in trading, or order routing to get value added. Eliminates major operational changes, either trading or routing, so not looking for more liquidity is hard to rationalize | order routers must reroute orders to the system to get value |
| Revenue Model | free to the users of liquidity, the "interests" pay. Eliminates the inappropriateness of charging customers added fees for best execution | users of liquidity in systems pay for price improvement |

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of enabling a running procedure that is not at a participating marketplace to respond to an order en route to the participating marketplace, comprising:

storing a procedure predefined by a trader at a storage location other than the participating marketplace as a stored procedure, the stored procedure being confidential to the trader, running the stored procedure to form the running procedure, receiving information relating to the order that has been sent to the participating marketplace and is en route to the participating marketplace, providing the information relating to the en route order to the running procedure so that the running procedure can determine whether to generate a spawned order, based upon the determination, generating the spawned order, and sending the spawned order to the participating marketplace essentially contemporaneously with the sending of the en route order.

2. The method of claim 1, wherein the stored procedure represents an order handling strategy of the trader.

3. The method of claim 1, wherein the running procedure has at least one trigger condition that must be satisfied to determine that a spawned order should be generated.

4. The method of claim 1, further comprising receiving parameters from the trader for use by the running procedure.

5. The method of claim 1, wherein the running procedure determines whether to generate a spawned order by comparing the information relating to the en route order with a trigger condition.

6. The method of claim 1, wherein at least one parameter of the spawned order is based on at least one parameter of the information relating to the en route order.

7. The method of claim 1, further comprising providing market data to the running procedure, and wherein the running procedure determines whether to generate a spawned order in accordance with the market data.

8. The method of claim 1, further comprising sending information to the trader consisting of only execution reports relating to the spawned order and status reports relating to the running procedure.

9. The method of claim 1, wherein the spawned order is prevented from being on the same side as the en route order, the side being either buy side or sell side.

10. The method of claim 1, further comprising making a determination of an absence of receipt of an execution report for the spawned order within a predetermined time interval after the spawned order has been sent to the participating marketplace, and then automatically sending a cancellation of the spawned order to the participating marketplace.

11. A system for enabling a running procedure that is not at a participating marketplace to respond to an order en route to the participating marketplace, comprising:
   a storage device for storing a procedure predefined by a trader at a location other than the participating marketplace as a stored procedure, the stored procedure being confidential to the trader,
   a first communication interface for receiving information relating to the order that has been sent to the participating marketplace and is en route to the participating marketplace,
   a processor for running the stored procedure to form the running procedure, for providing the order indication to the running procedure so that the running procedure can determine whether to generate a spawned order, and for generating the spawned order based upon the determination, and
   a second communication interface for sending the spawned order to the participating marketplace essentially contemporaneously with the sending of the en route order.

12. The system of claim 11, wherein the stored procedure represents an order handling strategy of the trader.

13. The system of claim 11, wherein the running procedure has at least one trigger condition that must be satisfied to determine that a spawned order should be generated.

14. The system of claim 11, wherein the first communication interface is also for receiving parameters from the trader for use by the running procedure.

15. The system of claim 11, wherein the running procedure determines whether to generate a spawned order by comparing the information relating to the en route order with a trigger condition.

16. The system of claim 11, wherein at least one parameter of the spawned order is based on at least one parameter of the information relating to the en route order.

17. The system of claim 11, wherein the processor is also for providing market data to the running procedure, and wherein the running procedure determines whether to generate a spawned order in accordance with the market data.

18. The system of claim 11, wherein the first communication interface is also for sending information to the trader consisting of only execution reports and status reports relating to the running procedure.

19. The system of claim 11, wherein the processor is also for preventing the spawned order from being on the same side as the en route order, the side being either buy side or sell side.

20. The system of claim 11, wherein the processor is also for making a determination of an absence of receipt of an execution report for the spawned order within a predetermined time interval after the spawned order has been sent to the participating marketplace, and then automatically sending, via the second communication interface, a cancellation of the spawned order to the participating marketplace.

21. A method of routing an order, comprising:
   receiving, from a first trader at a first location, a new order that has been sent to an order execution facility and is en route to the order execution facility,
   transmitting information based on the new order to a running procedure at a second location so that the running procedure can determine whether to generate a spawned order, the running procedure being predefined by a second trader different than the first trader, the running procedure being confidential to the second trader, and
   sending the new order to the order execution facility essentially contemporaneously with sending of the spawned order to the order execution facility.

22. The method of claim 21, wherein the second location is not controlled by the second trader.

23. The method of claim 21, wherein the transmitted information includes parameters of the new order.

24. The method of claim 21, wherein the transmitted information is not the order.

25. The method of claim 21, further comprising sending the spawned order to the order execution facility.

26. An order routing device, comprising:
   a first interface for receiving, from a first trader at a first location, a new order that has been sent to an order execution facility and is en route to the order execution facility,
   a second interface for transmitting information based on the new order to a running procedure at a second location so that the running procedure can determine whether to generate a spawned order, the running procedure being predefined by a second trader different than the first trader, the running procedure being confidential to the second trader, and
   a third interface for sending the new order to the order execution facility essentially contemporaneously with sending of the spawned order to the order execution facility.

27. The device of claim 26, wherein second location is not controlled by the second trader.

28. The device of claim 26, wherein the transmitted information includes parameters of the new order.

29. The device of claim 26, wherein the transmitted information is not the order.

30. The device of claim 26, wherein the third interface is also for sending the spawned order to the order execution facility.

31. A method of enabling a running procedure that is not at a marketplace to respond to an order en route to the marketplace, comprising:
   receiving, from a trader, (a) a selection indicating one of at least two predefined procedures, and (b) parameters for use by the selected predefined procedure,
   storing the received selection and parameters in a storage device as a stored interest, the stored interest being confidential to the trader,
   running the selected procedure with the received parameters to generate the running procedure,
   providing information relating to the order that has been sent to the marketplace and is en route to the marketplace to the running procedure so that the running procedure can determine whether to generate a spawned order,
   generating the spawned order in accordance with the determination, and sending the spawned order to the marketplace essentially contemporaneously with sending of the en route order.

32. The method of claim 31, wherein the stored interest represents an order handling strategy of the trader.

33. The method of claim 31, wherein the storage device is not controlled by the trader.

34. The method of claim 31, wherein the running procedure has at least one trigger condition that must be satisfied to determine that a spawned order should be generated.

35. The method of claim 31, wherein the running procedure determines whether to generate a spawned order by comparing the information relating to the en route order with a trigger condition.

36. The method of claim 31, wherein at least one parameter of the spawned order is based on at least one parameter of the information relating to the en route order.

37. The method of claim 31, further comprising providing market data to the running procedure, and wherein the running procedure determines whether to generate a spawned order in accordance with the market data.

38. The method of claim 31, further comprising sending information to the trader consisting of only execution reports relating to the spawned order and status reports relating to the running procedure.

39. The method of claim 31, wherein the spawned order is prevented from being on the same side as the en route order, the side being either buy side or sell side.

40. The method of claim 31, further comprising making a determination of an absence of receipt of an execution report for the spawned order within a predetermined time interval after the spawned order has been sent to the participating marketplace, and then automatically sending a cancellation of the spawned order to the participating marketplace.

41. A system for enabling a running procedure that is not at a marketplace to respond to an order en route to the marketplace, comprising:
   a first interface for receiving, from a trader, (a) a selection indicating one of at least two predefined procedures, and (b) parameters for use by the selected predefined procedure,
   a storage device for storing the received selection and parameters as a stored interest, the stored interest being confidential to the trader,
   a processor for running the selected procedures with the received parameters to generate the running procedure, for providing information relating to the order that has been sent to the marketplace and is en route to the marketplace to the running procedure so that the running procedure can determine whether to generate a spawned order, and for generating the spawned order in accordance with the determination, and
   a second interface for sending the spawned order to the marketplace essentially contemporaneously with sending of the en route order.

42. The system of claim 41, wherein the stored interest represents an order handling strategy of the trader.

43. The system of claim 41, wherein the storage device is not controlled by the trader.

44. The system of claim 41, wherein the running procedure has at least one trigger condition that must be satisfied to determine that a spawned order should be generated.

45. The system of claim 41, wherein the running procedure determines whether to generate a spawned order by comparing the information relating to the en route order with a trigger condition.

46. The system of claim 41, wherein at least one parameter of the spawned order is based on at least one parameter of the information relating to the en route order.

47. The system of claim 41, wherein the processor is also for providing market data to the running procedure, and wherein the running procedure determines whether to generate a spawned order in accordance with the market data.

48. The system of claim 41, wherein the first interface is also for sending information to the trader consisting of only execution reports relating to the spawned order and status reports relating to the running procedure.

49. The system of claim 41, wherein the spawned order is prevented from being on the same side as the en route order, the side being either buy side or sell side.

50. The system of claim 41, wherein the processor is also for making a determination of an absence of receipt of an execution report for the spawned order within a predetermined time interval after the spawned order has been sent to the participating marketplace, and then automatically sending a cancellation of the spawned order to the participating marketplace.

* * * * *